Oct. 16, 1951 R. P. ARTHUR 2,571,649
TELEPHONE FINGER WHEEL SUPPORT
Filed March 14, 1949 2 SHEETS—SHEET 1
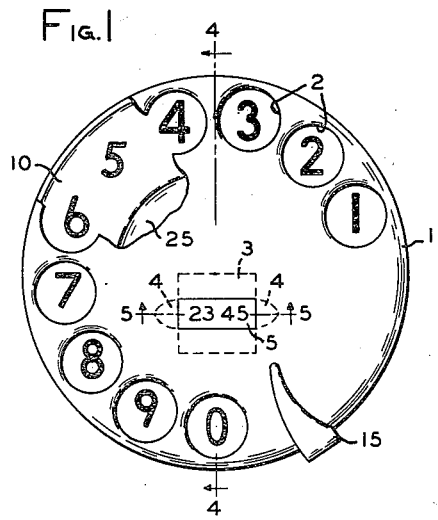
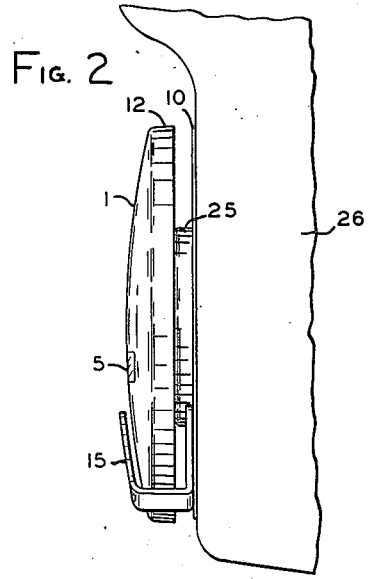
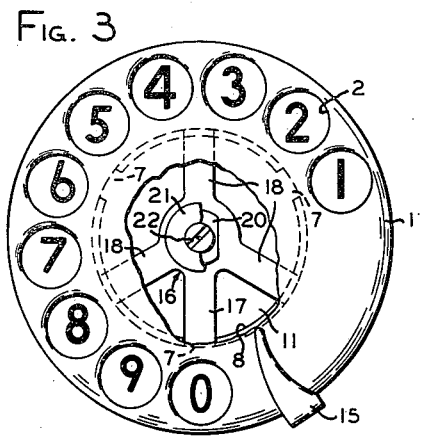
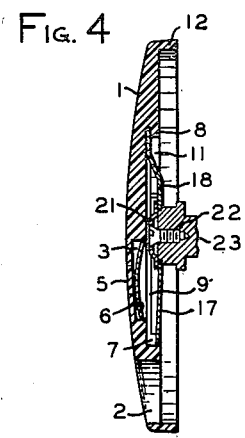
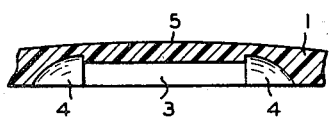
INVENTOR:
RICHARD P. ARTHUR
BY
ATTORNEY Oct. 16, 1951 — R. P. ARTHUR — 2,571,649
TELEPHONE FINGER WHEEL SUPPORT
Filed March 14, 1949 — 2 SHEETS—SHEET 2

INVENTOR:
RICHARD P. ARTHUR
BY
ATTORNEY

Patented Oct. 16, 1951

2,571,649

UNITED STATES PATENT OFFICE 2,571,649

TELEPHONE FINGER WHEEL SUPPORT

Richard P. Arthur, Chicago, Ill., assignor to Kellogg Switchboard and Supply Company, Chicago, Ill., a corporation of Illinois Application March 14, 1949, Serial No. 81,384

5 Claims. (Cl. 179—90)

This invention relates to a finger wheel for use with a dial type calling device of the type commonly employed with each of the individual telephones of automatic telephone systems. Its general object is to provide an improved and economical finger wheel which may be readily attached to the calling device and removed therefrom by a simple manual manipulation of the finger wheel.

A specific object is to provide a simple and reliable arrangement for detachably securing the finger wheel at its back to the calling device.

A further specific object is to provide a finger wheel which presents an attractive one-piece appearance and one which may be economically molded of plastic material.

According to one feature of the invention, a four-armed spider spring is provided which is keyed to the front hub of the main shaft of the calling device, with the arms of the spider spring cooperating with suitable openings in the back of the finger wheel to retain the finger wheel reliably in position until it is released by moving such finger wheel bodily forward and rotating it approximately sixty degrees.

According to another feature, the finger wheel may be molded of transparent plastic material, with all but a central zone thereof rendered opaque or colored, which permits a number card underlying such central zone to be visible while the other underlying parts are concealed from view.

According to a further feature, the number-card-holding arrangement in the first two embodiments is formed integrally with the finger wheel proper, which eliminates the extra parts formerly employed for this purpose and the special tool usually necessary for removing the extra parts for number card replacement.

Other objects and features will appear as the description progresses.

The accompanying drawings, comprising Figs. 1 to 9, show views of the improved finger wheel and the simple spider-spring attachment arrangement employed to detachably secure the finger wheel to the calling device.

Three embodiments differing principally in the mode of construction of the finger wheel are disclosed. The first embodiment, shown in Figs. 1 to 5, portrays a one-piece molded finger wheel; the second embodiment, illustrated in Figs. 6 and 7, shows a separate molded back rim inset and cemented in the back of the principal molded portion of the finger wheel; and the third embodiment, illustrated in Figs. 8 and 9, shows the principal portion of the finger wheel to be molded with an open front central portion with a separate piece inset and cemented therein.

Fig. 1 is a front view of the finger wheel with a portion thereof omitted to show a portion of the underlying number ring 10 and cup-like housing 25 of the calling device.

Fig. 2 shows a left side view of the structure of Fig. 1 mounted on the lower portion of a wall-type telephone.

Fig. 3 is a view similar to Fig. 1 with a portion of the central zone of the finger wheel omitted to show the spider-spring retaining arrangement.

Fig. 4 is a cross-sectional view taken along line 4—4 of Fig. 1.

Fig. 5 is an enlarged cross-sectional view of the central zone of the finger wheel taken along line 5—5 of Fig. 1.

Figure 6:
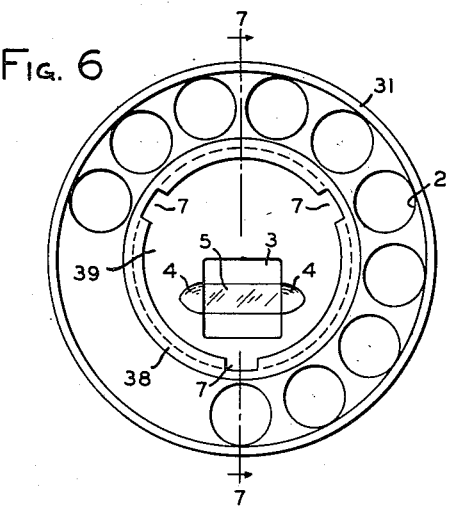
Fig. 6 is a back view of the structure of the second embodiment and Fig. 7 is a sectional view taken along line 7—7 thereof.

The invention having been described generally, a detailed description of the three embodiments thereof will now be given.

The first embodiment

Referring now to Figs. 1 to 5, the structure of the first embodiment is shown to include a one-piece finger wheel 1 effectively secured to the main shaft 23 of the associated calling device (not shown) by means of a four-armed spider spring 16 keyed to the central hub 20 of such main shaft.

Applicant has chosen to illustrate the invention as mounted on a wall-type telephone 26 of which certain portions have been omitted. See Fig. 2. The calling device controlled by finger wheel 1 is not shown, as it may be of any conventional type, as for example that disclosed in my copending application Dial Calling Devices, Serial No. 738,646, filed April 1, 1948, now Patent No. 2,503,538, granted April 11, 1950.

As is well known, the finger wheel 1 serves to selectively control the number of line breaks transmitted to the central-office equipment by the associated calling device or impulse sender located at a subscriber's station. Finger wheel 1 has ten finger holes 2 located near its periphery through which the respective numerals (1 to 9 and 0) of the underlying number ring 10 are visible. By placing a finger in a desired hole, the finger wheel is rotated clockwise against the action of the usual main spring (not shown) of the calling device until the finger engages the stationary finger stop 15. Upon release, the finger wheel and the main shaft are spring driven back to normal position incidental to the transmission of the selected series of impulses.

Finger wheel 1 may be molded of any suitable transparent plastic material which will impart a sufficient degree of transparency thereto to enable a number card 6 lying in back of the central hub portion thereof to be clearly visible from the front, and which will impart sufficient hardness to the part to prevent defacement thereof incident to its normal usage.

The finger wheel is formed to the disk-like configuration illustrated in Fig. 1, with the front surface thereof convex as shown best in Fig. 2.

The noted central hub portion is the integral part of the finger wheel which lies immediately in front of the central flanged recess, which is shown in outline form by the outer circle of dotted lines in Fig. 3.

The flanged well-like recess 11 is provided in the back central portion of finger wheel 1, with the opening thereof to the back. Three inwardly extending retaining flange segments 8, separated by relatively wide equi-distant openings 7, extend along the outer rim of recess 11, as shown by the inner circle of dotted lines in Fig. 3. These retaining flanges 8 serve to define the external limits of an underlying groove 9 formed thereby. Groove 9 of recess 11 is joined by openings 7 and has a diameter slightly greater than that of spider spring 16, the retaining arms 18 of which enter such groove 9 through openings 7 and are retained therein by retaining flanges 8. Retaining flanges 8 extend inwardly to overlie a substantial portion of the ends of retaining arms 18 of spider spring 16 in final assembly.

The central recess 11 and openings 7 may be formed by a molding operation with groove 9 undercut by a machining operation or molded in by employing a suitable compound mold member.

Referring now particularly to Figs. 1, 4, and 5, number card 6 and its retaining receptacle 3 will be described.

The number card retaining receptacle 3 is a generally square integrally formed offset portion extending from central recess 11 into the central hub portion of the finger wheel. The front of receptacle 3 forms a transparent rectangular window 5 in the central hub of the finger wheel for viewing matter imprinted on the directory number card 6 inserted within such receptacle. A relatively narrow semi-elliptical extension 4 extends horizontally from each vertical side of receptacle 3 as shown in Fig. 1, with each indented to a greater extent than receptacle 3 to thereby permit the ready removal of a number card 6.

The number card 6 may have the directory number identifying the subscriber's telephone imprinted thereon, as shown by numerals 2345 in the example illustrated in Fig. 1. The number card 6 may be a relatively thin and stiff member of pasteboard with one dimension thereof slightly greater than that of receptacle 3 to thereby provide the illustrated bowing of the card (Fig. 4) for retaining it within such receptacle. Applicant's disclosed integral number-card-holding arrangement eliminates the usual escutcheon ring and Celluloid cover ordinarily employed for retaining the number card, as well as the special tool commonly necessary for the removal of such ring.

It is contemplated that all of finger wheel 1, except the noted rectangular window portion 5 thereof, will be rendered translucent as by stippling or by coloring its back side. The window portion 5, which then alone remains transparent permits matter imprinted on card 6 to be clearly visible from the front with undesirable edges of the card concealed from view. Further, such an effacing arrangement eliminates unsightly members, such as spider spring 16 and its associated parts, from view. A depending circular skirt 12 is formed integrally with the finger wheel 1, and extends therefrom as illustrated in Figs. 2 and 4. Skirt 12 serves to conceal the finger wheel attachment parts from view and extends sufficiently backward in assembled position to conceal the front of the cup-like housing 25 of the calling device, housing 25 serving to conceal portions of the mainshaft 23 of such device.

The spider spring 16, shown in Figs. 3 and 4, serves to detachably secure finger wheel 1 to the central hub 20 of the main shaft 23 of the associated calling device.

As shown in Figs. 3 and 4, spider spring 16 is keyed to the central hub 20 of the main shaft 23 and is retained in such position by clamping washer 21 and screw 22 countersunk in the washer and threaded into hub 20.

Spider spring 16 is a relatively stiff metal stamping having three equi-distant forwardly offset retaining arms 18 and a relatively flat positioning arm 17 extending radially from the flat center of the spider spring, with arm 17 positioned midway between the two lowermost retaining arms 18.

Each retaining arm 18 is formed as shown for the uppermost of such arms 18 in Fig. 4. Each arm 18 has an intermediate angular offsetting portion which terminates in a flat offset end portion of substantial extent for engagement with the previously described groove 9 in finger wheel 1.

The positioning arm 17 in assembled position lies immediately above the numeral 0 of finger ring 10. See Fig. 3.

The retaining arms 18 are forwardly offset sufficiently from positioning arm 17 to permit arms 18 to enter respective openings 7 with positioning arm 17 loosely engaging the back of the respective flanged retaining segment 8. Positioning arm 17 will yield backwardly sufficiently under stress to permit retaining arms 18 to reach groove 9.

The simple final steps employed in assembling the finger wheel 1 with the spider spring 16 will now be described, with particular reference to Fig. 3.

The spider spring 16 is first secured in the illustrated position to the central hub of the calling device as previously described.

The finger wheel, with the directory number card 6 in mounted position, is positioned over the spider spring with the 0 digit number hole of the finger wheel (the number hole 2 normally overlying the digit 0 of numbering ring 10) lying over the digit 8 and with the retaining arms 18 entering their respective openings 7. In this position, the positioning arm 17 loosely engages the back of the retaining flange 8 which extends between finger holes 0 and 1.

The finger wheel is pushed backwardly until the retaining arms 18 reach groove 9. This backward movement forces positioning arm 17 to yield backwardly under tension.

The finger wheel is then rotated counter clockwise approximately sixty degrees with the retaining arms 18 entering groove 9 at the beginning of such rotation and passing therethrough during the continuance thereof. During the sixty degree rotation of the finger wheel, the positioning arm 17 slidingly engages the back of the associated retaining flange 8 under the noted tension. At the termination of such rotation the positioning arm 17 lies exactly opposite opening 7 adjacent to the 0 finger hole. The positioning arm 17, impelled forwardly by its stored tension, enters such opening 7 to a point midway therein.

The retaining arms 18, lying in groove 9, reliably retain the finger wheel in position with the positioning arm 17, snugly engaging the sides of its opening 7, preventing rotational displacement of such arms 18 in said groove.

The finger wheel is easily detached from the spider spring by a simple manual manipulation which, as in the attachment process, requires no tools, special, or otherwise.

In removing the finger wheel, the bottom portion thereof is moved forwardly, with the retaining arms yielding slightly, until the positioning arm 17 wholly emerges from its associated slot 7. The finger wheel is then rotated counter clockwise sixty degrees as before. At the termination of such rotation the retaining arms 18 leave groove 9 and enter respective openings 7, whereupon the finger wheel is released.

The second embodiment

Figure 7:
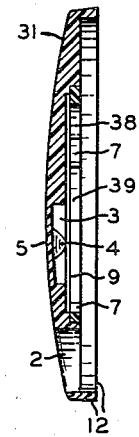

The second embodiment, shown in Figs. 6 and 7, discloses a modified finger wheel of two-piece construction which is interchangeable with the molded one-piece finger wheel of the first embodiment.

As a matter of convenience, only the modified construction of the finger wheel will be shown and described in this, and in the third embodiment, as the associated external parts thereof are the same for the three embodiments as disclosed for the first.

The finger wheel constructed according to the principles of the second embodiment is similar to the finger wheel disclosed in the first embodiment.

The principal structural difference between the finger wheel of the first and second embodiments is that in the first, the finger wheel comprises a one-piece part, while in the second, a principal portion of the finger wheel is molded with an inset in the back for receiving a separate retaining ring.

One advantage of the disclosed separate structure lies in the economy of molding a simpler principal portion and applying the retaining ring thereto. In addition, while applicant has chosen to describe a retaining ring as molded of plastic material and cemented in place, it is presently contemplated that a comparatively strong metal retaining ring, economically stamped from suitable sheet stock, may be employed and secured to the principal portion by means of screws passing axially through the retaining ring and threaded into the principal portion.

Figs. 6 and 7 show respectively, a back and a cross-sectional view of the complete finger wheel. The principal portion 31 of the finger wheel is formed substantially as described for finger wheel 1 of the first embodiment, except that herein, the retaining flange segments 8 of the first embodiment are eliminated. A circular inset portion is provided in the back of a central recess 39 for receiving the circular retaining ring 38 which replaces such retaining flanges 8.

A central recess 39, generally similar to recess 11 of the first embodiment (Figs. 3 and 4), is provided in the back of the principal portion 31 and is shown in dotted outline in Fig. 6. Recess 39 has an inner section which receives the retaining arms 18 in the same manner as described for groove 9 of recess 11 in the first embodiment, and such inner section has the same final dimensions as such groove.

The central recess 39 is appreciably widened, immediately after the noted inner portion thereof, to provide an outer section of increased diameter which forms a circular shelf or indentation, shown by the solid circular line lying just outside of the dotted lines in Fig. 6. See also Fig. 7. The widened outer section of recess 39 is formed to receive the retaining ring 38, such ring being dimensioned as to abut the circular sides and to engage the bottoming circular shelf of such outer section.

The flat retaining ring 38 may be molded of suitable plastic material, or as indicated may be punch-pressed from suitable sheet stock, to the illustrated form with the openings 7 indented therein as shown in Fig. 6. Openings 7 are similar in form and function to those bearing the same reference character in the first embodiment.

Suitable plastic cement is applied to the contacting portions of the retaining ring 38 and the circular sides and bottom of the outer section of recess 39, whereupon retaining ring 38 is positioned as illustrated and firmly retained therein upon the hardening of the cement. Where a metal retaining ring is employed, the horizontal dimensions of the outer section of recess 11 and of the retaining ring may be slightly increased to give greater purchase to screws axially retaining the ring in place.

With the retaining ring 38 firmly secured in position, the underlying inner section of recess 39 forms a groove similar to groove 9 of the first embodiment, with the retaining ring 38 replacing the retaining flanges 8 of the first embodiment in defining the external limits of such groove and with openings 7 of ring 38 joining such groove as described in the first embodiment. The portions of retaining ring 38, lying between openings 7 thereof, serve as retaining flanges for retaining arms 18 of spider spring 16 in the same manner as described for retaining flanges 8 of the first embodiment.

The third embodiment

Figure 8:
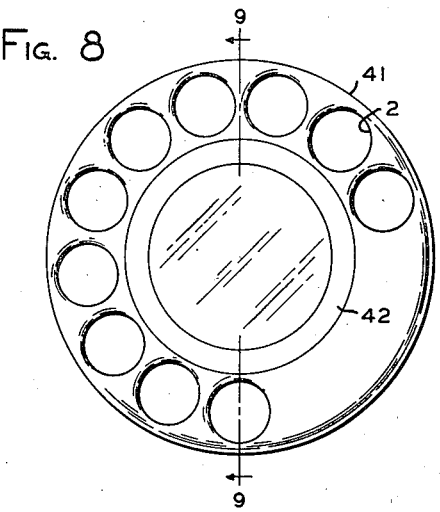
Fig. 8 is a front view of the structure of the third embodiment and Fig. 9 is a sectional view taken along line 9—9 thereof.
Figure 9:
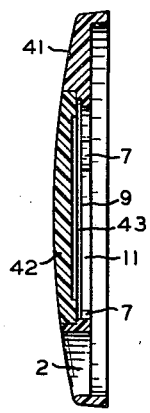

The third embodiment, shown in Figs. 8 and 9, discloses a two-piece finger wheel which is interchangeable with finger wheel 1 in the structure of the first embodiment.

The two-piece finger wheel constructed according to the principle of the third embodiment is generally similar to the one-piece finger wheel of the first.

The principal structural difference between the finger wheel of the first and third embodiments is that in the first, the finger wheel comprises a one-piece part, while in the third, the finger wheel is formed with an open front central portion and a separate circular window disk is inset and cemented therein.

The construction of the third embodiment is advantageous in that it enables the principal molded portion 41 to be made of pigmented plastic, with the inserted central window disk 42 molded of suitable transparent plastic material to enable the number card lying beneath it to be visible.

Fig. 8 shows a front view of the completed finger wheel, and Fig. 9 shows a cross-sectional view taken along lines 9—9 of Fig. 8.

The principal portion 41 of the finger wheel may be molded of suitable pigmented plastic material to substantially the form disclosed for finger wheel 1 of the first embodiment, except that herein, it is formed with an open central front portion. The open central front portion is formed as illustrated in Fig. 9 and serves to receive the separate central window disk 42 which is inset and retained therein by suitable cement.

The central window disk 42 is a simple molded transparent member of the illustrated form, with a circular recessed portion 43 molded in the back central portion thereof. The recessed portion 43 receives a circular directory number card (not shown) which may be provided with suitable adhesive material on its front surface which is effective to retain such card in position in recess portion 43. The portions of the central window disk 42, which extend beyond the ends of number card recess 43 thereof, define one side of groove 9 and may be colored in conformity with the principal portion of the finger wheel to obscure the underlying portions of the spider spring which in final assembly engages such groove 9.

I claim:

1. In a telephone calling dial device including a rotatable actuating shaft, a manually operated finger wheel to rotate said shaft having a central opening through the lower surface thereof including recesses spaced therearound and an annular groove to which the recesses extend, a flexible spider spring secured at its center to the said shaft for supporting the finger wheel and having support legs spaced to enter the said groove through the said recesses respectively, and a similar positioning leg lying between two of said support legs, all said support legs passing through said recesses into said annular groove subject to the spider spring being urged toward the finger wheel to flex the said positioning leg, said positioning leg cooperating with any one of said recesses to lock the parts against rotation upon being brought into position by rotation of the support arms in said groove, said support legs being flexible in a direction normal to said finger wheel to permit the positioning leg to be disengaged from said structure responsive to the finger wheel being urged upwardly.

2. In a telephone calling dial device including a rotatable shaft and a manually operated finger wheel to rotate said shaft, and means for securing said finger wheel on the control shaft in operative relationship thereto responsive to said finger wheel being urged in a direction axially downward over said shaft and moved rotationally with respect thereto, and means responsive to said finger wheel being urged upward and rotationally of said control shaft for permitting removal of the finger wheel.

3. A spider type support for a finger wheel employed with a telephone calling dial device wherein a rotatable actuating shaft protrudes therefrom, said support comprising a flat central portion secured to the protruding end of said shaft and similar angularly spaced flexible legs extending radially outwardly in different directions from said central portion, said legs comprising a group of support legs and a positioning leg lying between two of them, said support legs having longitudinal portions each of which defines a given angle with respect to the axis of said shaft and finger wheel engaging portions defining a plane normal to the shaft, said positioning leg lying rearwardly of the said plane.

4. A spider type support for a finger wheel employed with a telephone calling dial device wherein a rotatable actuating shaft protrudes therefrom, said support comprising a flat central portion secured to the protruding end of said shaft and similar angularly spaced flexible legs extending radially outwardly in different directions from said central portion, said legs comprising a group of support legs and a positioning leg lying between two of them, said support legs being forwardly offset to define a plane normal to the shaft but lying substantially forward of said central portion, said positioning leg lying substantially within the plane of said central portion.

5. In a telephone calling device having a rotatable actuating shaft, a manually operated finger wheel to rotate said shaft having a central indentation in its lower surface, an annular groove in the wall of said indentation, spaced recesses extending from the bottom of said finger wheel to said groove to provide entrances thereto, a flexible spider spring secured at its center to said shaft for supporting the finger wheel, said spring having support legs spaced to permit entrance of end portions thereof in said groove through said recesses, thereby to rotatably secure said finger wheel to said support, and a similar positioning leg on said spring lying between two of said support legs, the groove engaging portions of said support legs being offset from said positioning leg to permit retraction of said positioning leg within one of said recesses upon being rotated to a position corresponding to said one recess, whereby said finger wheel is disengageably latched to the support spring.

RICHARD P. ARTHUR.

REFERENCES CITED

The following references are of record in the file of this patent:

UNITED STATES PATENTS

| Number | Name | Date |
|---|---|---|
| 2,194,306 | Huxham | Mar. 19, 1940 |
| 2,307,226 | Lum | Jan. 5, 1943 |
| 2,307,463 | Lum | Jan. 5, 1943 |
| 2,327,782 | Goff | Aug. 24, 1943 |
| 2,359,841 | Goff et al. | Oct. 10, 1944 |